United States Patent
Fischer

(10) Patent No.: US 8,832,856 B2
(45) Date of Patent: Sep. 9, 2014

(54) AUTHORITY DELEGATION FOR BUSINESS OBJECTS

(75) Inventor: Martin Fischer, Heidelberg (DE)

(73) Assignee: SAP AG, Walldorf (DE)

( * ) Notice: Subject to any disclaimer, the term of this patent is extended or adjusted under 35 U.S.C. 154(b) by 108 days.

(21) Appl. No.: 13/467,903

(22) Filed: May 9, 2012

(65) Prior Publication Data

US 2013/0305387 A1    Nov. 14, 2013

(51) Int. Cl.
 *G06F 21/00*   (2013.01)
(52) U.S. Cl.
 USPC ............... 726/28; 726/26; 726/27; 713/187
(58) Field of Classification Search
 USPC ...................................... 726/27–30
 See application file for complete search history.

(56) References Cited

U.S. PATENT DOCUMENTS

| | | | | |
|---|---|---|---|---|
| 6,073,242 A | * | 6/2000 | Hardy et al. | 726/1 |
| 2010/0011448 A1 | * | 1/2010 | Wagner | 726/27 |

* cited by examiner

*Primary Examiner* — Ghazal Shehni

(57) ABSTRACT

A method relates to authority checks governing user access to business object attachments in a store of business object attachments. The business object attachments are semantically associated with business objects of one or more remote computer systems. The method includes, at a content management interface layer that is communicatively coupled to the store of business object attachments, sending a request for user authority checks on a parent business object of a business object attachment to an originating computer system and receiving results of the user authority checks from the originating computer system.

19 Claims, 3 Drawing Sheets

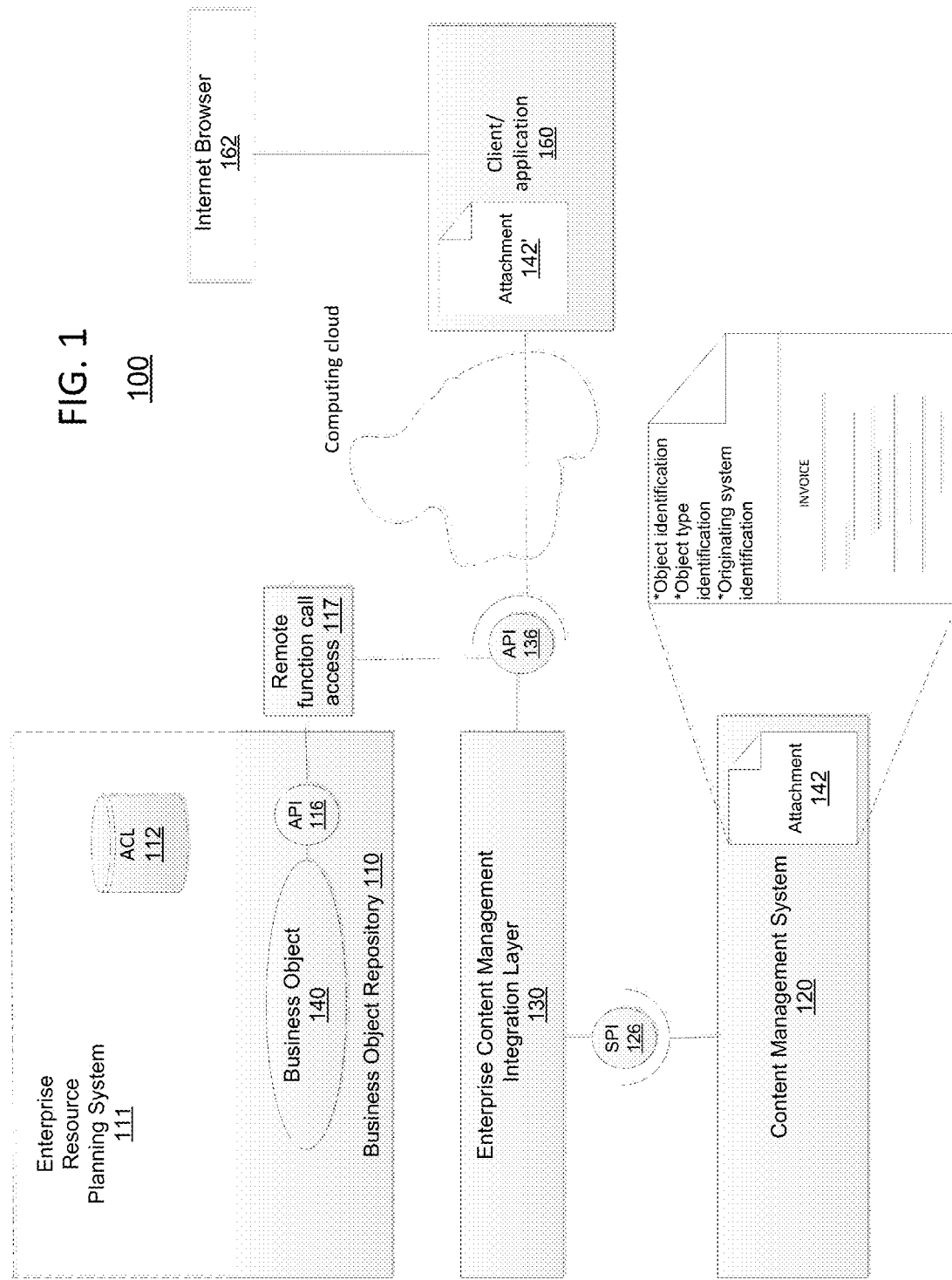

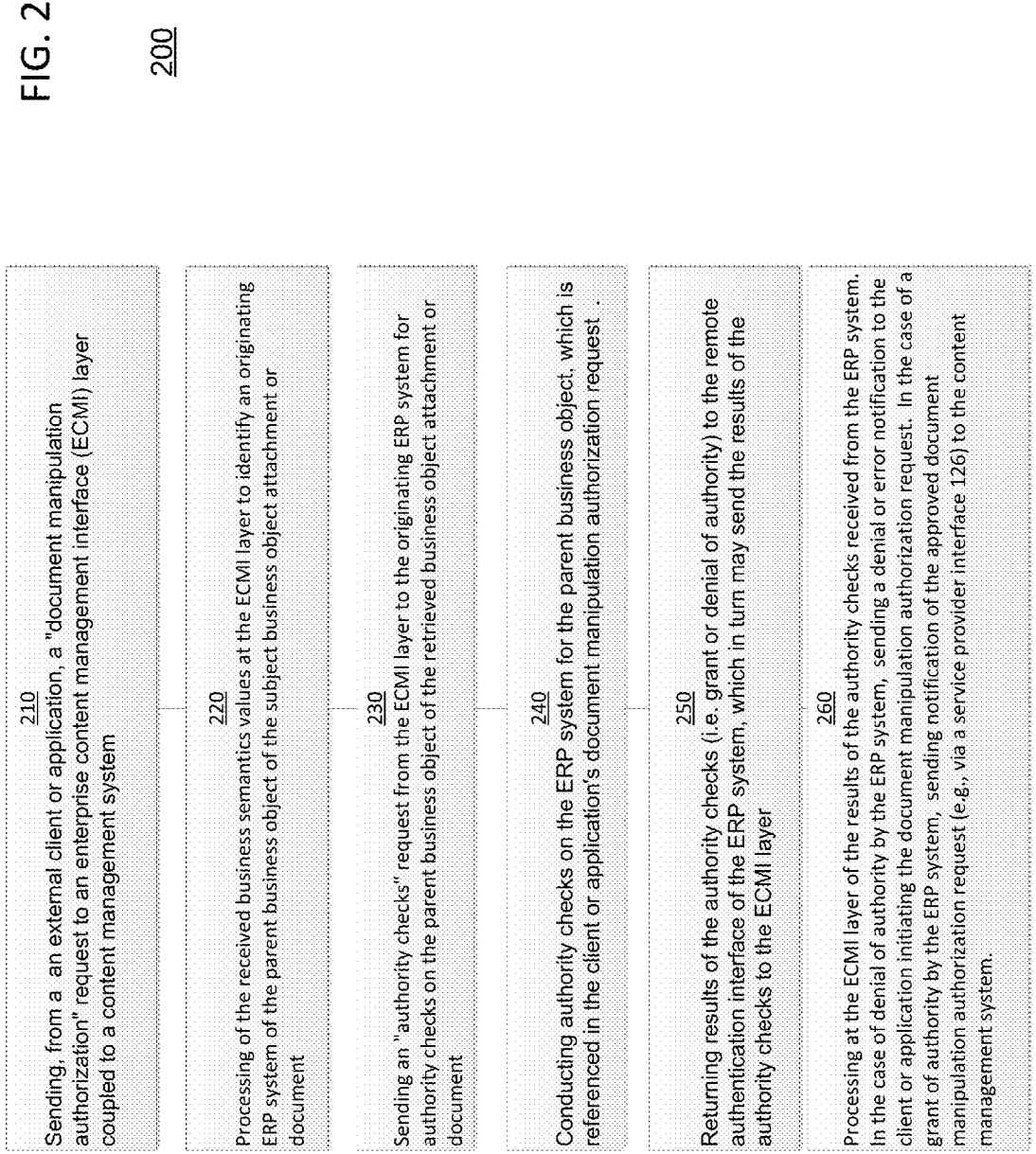

210 Sending, from a an external client or application, a "document manipulation authorization" request to an enterprise content management interface (ECMI) layer coupled to a content management system 220 Processing of the received business semantics values at the ECMI layer to identify an originating ERP system of the parent business object of the subject business object attachment or document 230 Sending an "authority checks" request from the ECMI layer to the originating ERP system for authority checks on the parent business object of the retrieved business object attachment or document 240 Conducting authority checks on the ERP system for the parent business object, which is referenced in the client or application's document manipulation authorization request .

250 Returning results of the authority checks (i.e. grant or denial of authority) to the remote authentication interface of the ERP system, which in turn may send the results of the authority checks to the ECMI layer 260 Processing at the ECMI layer of the results of the authority checks received from the ERP system. In the case of denial of authority by the ERP system, sending a denial or error notification to the client or application initiating the document manipulation authorization request. In the case of a grant of authority by the ERP system, sending notification of the approved document manipulation authorization request (e.g., via a service provider interface 126) to the content management system.

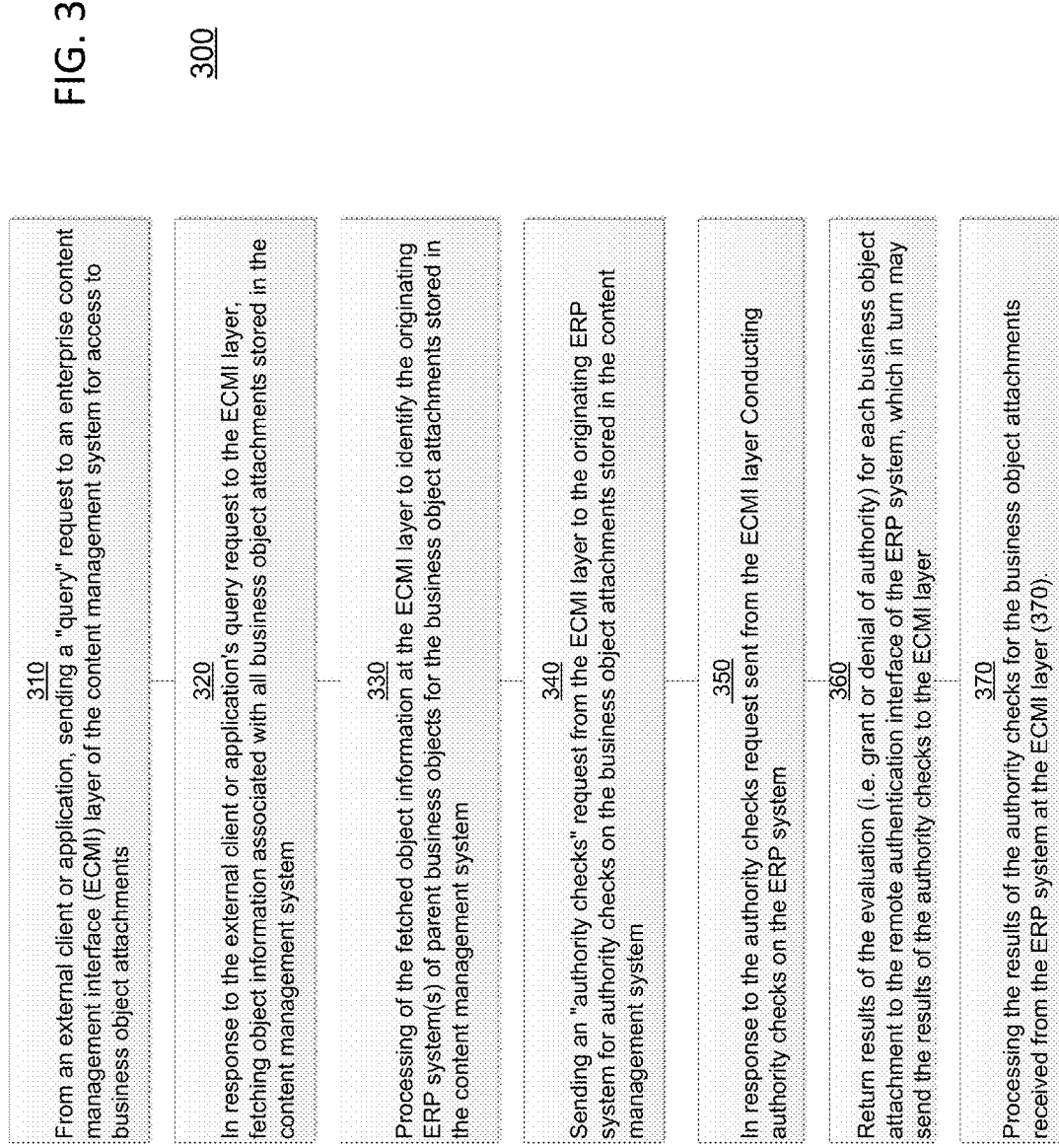

AUTHORITY DELEGATION FOR BUSINESS OBJECTS

BACKGROUND

For security or other reasons (e.g., managing loads), a computer system may limit user access to data on the system, or otherwise control user actions or operations on the system. Users may be authenticated and authorized to access only certain data, or may be granted privileges to take only certain actions on the computer systems.

A computer system may use object-oriented technology and may make processes and data available in the form of objects (e.g., file and folder types). The computer system may deploy an access control list (ACL)-based security model to govern authorization processes to grant users access to or privileges to manipulate (e.g., read, write, copy, delete, etc.) objects in the computer system. An ACL, with respect to a computer file system, is a list of permissions or authorizations attached to an object. An ACL specifies which users or system processes are authorized to access the objects and what operations are allowed on given objects. Each "authority" entry for an object in a typical ACL specifies a subject and an operation.

An organization may deploy a large computer system (e.g., an enterprise resource planning system) to integrate diverse business processes (e.g., finance, HR, manufacturing, warehouse, etc.). Considerable effort can go into establishing business object authorities or ACL settings for user access to and user privileges for various actions on the diverse business objects in the large computer system. When a user requests access to or an action on an object in the computer system, the computer system's operating system first checks the ACL for an applicable entry to decide whether the requested access or action is authorized. The user authorities or ACL settings that apply to business objects (e.g., files or folders) are also applicable to business object attachments (a user's travel expense report or invoice) when users seek access to or actions on them directly from the organization's computer system.

With emergence of new technologies such as cloud computing and increasing mobile consumption of computer applications, users can seek access to or actions on business object attachments from computing environments other than the organization's computer system. There is a need is to simplify application of user authorities or ACL settings for user access to and actions on the business object attachments from the other computing environments.

In general, security and authorization mechanisms, which control access to operations or data in the computer systems, can be both direct and indirect. A computing system may conduct direct security checks of user credentials or authorization profiles (e.g., authentication identification codes (IDs) and passwords) at an attachment interface or facility (e.g., a log-in screen, at a firewall etc.)) before users can attach (i.e. gain access) to a resource (e.g., individual files or data objects, computer devices, network connections, computer programs, applications, and functionality provided by computer applications, etc.) of the computing system.

SUMMARY

In one general aspect, a method relates to authority checks governing user access to business object attachments or documents stored in a content management system. The stored business object attachments are semantically associated with business objects of remote computer systems. In one implementation of the method, semantic terms (e.g., object identifier, object type identifier and originating system identifier) are used to associate business object attachments with business objects of the remote computer systems.

In another general aspect, the method utilizes a content management interface layer that is communicatively coupled to the content management system to mediate user authorization checks conducted by the remote computer systems for user access to business object attachments stored in the content management system. The method includes, in response to receiving a request for authorization to access or manipulate a business object attachment from an external application user at the content management interface layer, processing the request for authorization to identify an originating computer system of a parent business object of the business object attachment. The method further includes sending a request for and receiving results of user authority checks on the parent business object by the originating computer system at the content management interface layer. Sending the request for user authority checks the originating computer system includes sending semantic values of the object identifier and the object type identifier associated with the business object attachment to the originating computer system.

In one general aspect, a system includes a content management interface layer communicatively coupled via a service provider interface to a store of business object attachments, which are associated with parent business objects in one or more remote computer systems. The store includes object identifier, object type identifier and originating system identifier information associated with the stored business object attachments.

In one aspect of the system, the content management interface layer receives and process a request for authorization to access or manipulate a business object attachment from an external client or application. The content management interface layer uses an originating system identifier value associated with the business object attachment to identify an originating computer system of a parent business object of the business object attachment. The content management interface layer sends object identifier and object identifier values associated with the business object attachment with a request for user authority checks to a remote access interface of the originating computer system. The content management interface layer receives results of the requested user authority checks by the originating computer system, and notifies the store of business object attachments if the request for authorization to access or manipulate the business object attachment from the external client or application is approved.

In one general aspect, a non-transitory computer readable medium includes instructions capable of being executed on a microprocessor to operate a content management interface layer that is communicatively coupled to a store of business object attachments associated with business objects of one or more remote computer systems. The instructions when executed allow the content management interface layer to process a request from an external client or application for authorization to access or manipulate a business object attachment. Further, the instructions when executed on the microprocessor cause the content management interface layer to send object identifier and object identifier values associated with the business object attachment with a request for user authority checks on a parent business object of the business object attachment to an originating computer system of the business object attachment. The instructions when executed on the microprocessor further cause the content management interface layer to process results of user authority checks on the parent business object by the originating computer system and to notify the store of business object attachments if the request for authorization to access or manipulate the business object attachment from the external client or application is approved.

The details of one or more implementations are set forth in the accompanying drawings and the description below. Further features of the disclosed subject matter, its nature and various advantages will be more apparent from the accompanying drawings the following detailed description, and the claims.

BRIEF DESCRIPTION OF THE DRAWINGS

FIG. 1 is a block diagram illustration of a system in which an authorities framework enables secure authorization of user access to and action on business object attachments in collaborative mobile or cloud computing scenarios, in accordance with the principles of the disclosure herein.

FIG. 2 is a flow diagram of an example method for evaluation of business object authorities stored on an enterprise resource planning (ERP) system for an external client or application user seeking to access or manipulate business object attachments stored on a content management system, in accordance with the principles of the disclosure herein.

FIG. 3 is a flow diagram of an example method for evaluation of business object authorities stored on an enterprise resource planning (ERP) system in response to an external client or application's request for access to business object attachments stored on a content management system, in accordance with principles of the disclosure herein.

DETAILED DESCRIPTION

An "authorities" framework enables secure authorization of user access to and action on business object attachments in collaborative mobile or cloud computing scenarios. Business object attachments (e.g., documents) related to business objects of a first computer system (e.g., an enterprise resource planning (ERP) system) may be stored in a second computer system (e.g., a content management system). Under the authorities framework, business object authorities may be generically maintained at a central location (e.g., in Access Control Lists (ACL)) in the ERP system. Further, under the authorities framework, business semantics (e.g., values for object identifier, object type identifier and origin system identifier) associated with the business object attachments may be stored in the content management system.

User authorization for user access to and action on the business object attachments stored in the content management system may be granted using business object authorities that may be defined and listed in the ERP system. The authorities framework, by including business semantics (e.g., values for object identifier, object type identifier and origin system identifier) in the stored business object attachments, enables authorization processes for the content management system to be based on the business semantics. Mapping of business object authorities from the ERP system to technical Access Control Lists of the content management system can be avoided.

FIG. 1 shows a system 100 in which the authorities framework enables secure authorization of user access to and action on business object attachments in collaborative mobile or cloud computing scenarios, in accordance with the principles of the disclosure herein.

System 100 includes a Business Object Repository 110, which may be a part of a larger Enterprise Resource Planning system 111, and a Content Management system 120 coupled to an Enterprise Content Management Integration layer 130.

System 100 may be configured to authorize a remote client application 160 (which, for example, may be accessible through an Internet Browser 162) to work on business object attachments (e.g., documents) that may be stored in Content Management System 120. System 100 may be configured generate user authorizations to work on business object attachments stored in Content Management System 120 based on business object authorities (e.g., Access Control List 112) that may be listed on the Enterprise Resource Planning system 111.

In Enterprise Resource Planning system 111, various and diverse business processes and data may be represented as business objects (e.g., business object 140). An example business object type may be "SalesOrder," which represents a customer's request to a company to supply a particular quantity of material at a certain point in time or to perform services at a certain point in time. An example business object (i.e. an instance of the business object type SalesOrder) may be a particular "sales order #102." A business object may be described by its attributes. Sales order #102 may be described, for example, by attributes such as: Sold-to party, Sales organization, Sale date, Net value of order, Currency of sales, etc. In Enterprise Resource Planning system 111, business object authorities for user access or actions on the business objects may be developed and stored in Access Control List 112. An example business object authority for the business object sales order#102 that may be stored in Access Control List 112 may, for example, be: User "Sales manager" is allowed to see sales orders of a certain sales organization.

The business objects in Enterprise Resource Planning system 111 may be of different generic types (e.g. vendors, leads, customers, sales orders, financial documents, etc.) that are identified by unique object and object type identifiers. In system 100, Business Object Repository 110 may provide interfaces (e.g., application programming interface (API) 116) to the business objects of Enterprise Resource Planning system 111. Business Object Repository 110 may further provide a remote interface (e.g., remote function call access 117) to receive user requests for authority checks for business object instances that are identified by unique object and object type identifiers. Users may call authority modules in Enterprise Resource Planning system 111 for authority checks on the different business objects and object types via the interfaces (116, 117) provided by Business Object Repository 110. The authorities for business object instances and their particular attributes may be evaluated by the authority modules, and the evaluations may be passed back to the users via the interfaces (116, 117).

In system 100, a business object attachment (e.g., attachment 142) may be a document (e.g., an invoice, a contract, a quality control report, etc.), which may be logically attached to a business object in an application. The attachment may provide documentation (e.g., transactional information or quality data) for the process in which the business object is involved. The attachment may be generally available when users access or browse the business object in Enterprise Resource Planning system 111.

Creating an attachment to a business object (e.g., business object 140) may involve using an attachment service within Business Object Repository 110. The business object attachments (e.g., documents) created within Business Object Repository 110 may be stored in an external repository, for example, in Content Management system 120. The business object attachments may be stored along with associated metadata or properties that further describe the document. Further, under the authorities framework of this disclosure, Business Object Repository 110 may provide business semantics or business object information (e.g., object identifier, object type identifier and origin system identifier) to be associated with or stored with the business object attachment in Content Management system 120. FIG. 1 shows an example attachment (e.g., attachment 142), which includes associated values for object identifier, object type identifier and origin system identifier, stored in Content Management system 120.

Further in system 100, Enterprise Content Management Integration (ECMI) layer 130 may connect or couple document repositories of various content management systems (e.g., Content Management system 120) by means of a service provider interface (SPI) 126. ECMI layer 130 may further expose these document repositories to an external application (e.g., application 160) through a unified Application Programming Interface (API) 136. API 136 may provide methods to manipulate (e.g., read, write, delete) content and metadata in the connected content management systems (e.g., Content Management system 120). In addition, API 136 may provide methods to call remote authority interface 117 of Business Object Repository 110 and provide methods to evaluate the business object authorities on the content (e.g., attachment 142) in Content Management system 120 sought to be accessed or manipulated by the external application (e.g., application 160).

With reference to FIG. 1, it will be noted that client/application 160 may be an external client or application outside of Enterprise Resource Planning system 111 and Content Management system 120. Client/application 160 may, for example, be an application hosted on a mobile device or an application hosted in a computing cloud. Client/application 160 may communicate directly with API 136 of ECMI layer 130, for example, via wire or wireless links. In particular, client/application 160 may communicate directly with API 136 of ECMI layer 130 with regard to authorities for access to or for manipulating business object attachment 142 stored on Content Management system 120.

FIG. 2 shows an example method 200 for evaluation of business object authorities stored on an enterprise resource planning (ERP) system for an external client or application user seeking to access or manipulate business object attachments stored on a content management system. Method 200 may, for example, be implemented in cloud computing or mobile computing scenarios involving system 100. In particular, method 200 may be deployed in a situation with a dedicated object instance, for example, an instance in which a business object attachment (e.g., attachment 142') has been previously retrieved and stored on the external client or application (e.g., application 160). The dedicated object instance may, for example, be a dedicated sales order, and the business object attachment may, for example, be a contract or invoice document for the dedicated sales order. The business object attachment may have been previously retrieved and stored on the external client or application, for example, by another user.

Method 200 may begin in response to an external client or application sending a "document manipulation authorization" request to an enterprise content management interface (ECMI) layer coupled to the content management system (210). Sending the document manipulation authorization request 210 may include sending the document manipulation authorization request to an application programming interface (API) of the ECMI layer. The document manipulation authorization request may be a request for authorization to manipulate (e.g., read, write, delete, copy, etc.) a business object attachment or document (e.g., attachment 142') that has been already retrieved by the external client or application (e.g., application 160). Sending the document manipulation authorization request 210 may include sending business semantics identifying the retrieved business object attachment or document in the request. The business semantics included in the document manipulation authorization request may, for example, include values (e.g., object identifier, object type identifier, and origin system identifier values) that may uniquely identify the parent business object of the retrieved business object attachment or document.

In method 200, sending a document manipulation authorization request 210 may further include sending user credentials required for authentication with the request. The user credentials included in the document manipulation authorization request may include credentials that are required by the user authentication algorithms deployed by the ERP system. The user credentials may include, for example, one or more of a user id, passcodes, public or private security keys, certificates, or other items that may be required to authenticate the user.

Method 200 further includes processing of the received business semantics values at the ECMI layer to identify an originating ERP system of the parent business object of the subject business object attachment or document (220). The processing of the received business semantics values may, for example, identify the originating ERP system from the value of the origin system identifier included in the document manipulation authorization request. Further, the processing of the received business semantics values may include obtaining connection parameters for connecting to the remote ERP system based on the origin system identifier value.

Method 200 further includes sending an "authority checks" request from the ECMI layer to the originating ERP system for authority checks on the parent business object of the retrieved business object attachment or document (230). The ECMI layer may forward the request, for example, to a remote authentication interface (e.g., remote function call access 117) of the originating ERP system. The request from the ECMI layer to the originating ERP system may include object attributes (e.g., object identifier and object type identifier values) that were included in the client or application's document manipulation authorization request. The request from the ECMI layer to the originating ERP system may also include user credentials (e.g. user id) found in or associated with the client or application's document manipulation authorization request.

In response to the authority checks request from the ECMI layer 230, method 200 may include conducting authority checks on the ERP system for the parent business object, which is referenced in the client or application's document manipulation authorization request (240). The ERP system may, for example, conduct authority checks based on object attributes and user credentials included in the authority checks request forwarded by the ECMI layer to the remote authentication interface of the ERP system. The remote authentication interface receiving the request from the ECMI layer may, for example, pass forward values for object identifier, object type identifier and user id to an authority check module in the ERP system. The authority check module may evaluate or compare the forwarded object identifier, object type identifier and user id values with business object authorities (e.g., ACL 112) stored in the ERP system. The authority check module may return results of the authority checks (i.e. grant or denial of authority) to the remote authentication interface of the ERP system, which in turn may send the results of the authority checks to the ECMI layer (250). The remote authentication interface of the ERP system may, for example, send the results of authority checks (i.e. grant or denial of authority) via a return call from the ERP system to the API of the ECMI layer.

Method 200 may include processing at the ECMI layer of the results of the authority checks received from the ERP system (260). In the case of denial of authority by the ERP system, processing of the results by the ECMI layer 270 may include sending a denial or error notification to the client or application initiating the document manipulation authorization request. Conversely, in the case of a grant of authority by the ERP system, processing of the results by the ECMI layer 260 may include sending a grant or approval notification to the client or application initiating the document manipulation authorization request, and sending notification of the approved document manipulation authorization request (e.g., via a service provider interface 126) to the content management system. The content management system may in response allow the client or application to manipulate the document as approved.

FIG. 3 shows an example method 300 for evaluation of business object authorities stored on an enterprise resource planning (ERP) system in response to an external client or application's request for access to business object attachments stored on a content management system. Like method 200, method 300 may, for example, be implemented in cloud computing or mobile computing scenarios involving system 100. In particular, method 300, which may be agnostic with respect to specific business object instances, may be implemented to deal with requests for general access to a group of business object attachments (e.g. a query over all sales orders of a certain customer). Like method 200, method 300 may utilize an enterprise content management interface (ECMI) layer of the content management system to mediate authorization checks for granting access or privileges to business object attachments or documents stored in the content management system.

Method 300 may begin in response to an external client or application sending a "query" request to an enterprise content management interface (ECMI) layer of the content management system for access to business object attachments (310). The query request may include user credentials required for user authentication. The user credentials included in the query request may include credentials that are required by the user authentication algorithms deployed by the ERP system. The user credentials may include, for example, one or more of a user id, passcodes, public or private security keys, certificates, or other items that are required to authenticate the user.

In method 300, in response to the external client or application's query request the ECMI layer may fetch object information associated with all business object attachments stored in the content management system (320). In particular, the ECMI layer may fetch object identifier, object type identifier and origin system identifier values in the metadata of the business object attachments stored in the content management system.

Further, method 300 may include processing of the fetched object information at the ECMI layer to identify the originating ERP system(s) of parent business objects for the business object attachments stored in the content management system (330). Processing of the fetched object information may, for example, identify the originating ERP system(s) from the values of the origin system identifiers included the fetched object information. Further, processing of the fetched object information may include obtaining connection parameters for connecting to remote ERP system(s) based on the values of origin system identifiers included the fetched object information.

It will be noted that the origin system identifier values included the fetched object information may show that business object attachments originated from a single ERP system or from multiple ERP systems. In the case that the business object attachments originated from multiple originating ERP systems, method 300 may further involve sorting or segregating the fetched object information by individual originating ERP system. Further elements and processes of method 300 for authority checks may be carried out in the same or similar manner for each of the multiple originating ERP systems one-by-one using the sorted or segregated fetched object information. For convenience in description, the further elements and processes of method 300 for authority checks may be described herein for the case of business object attachments originating from a single ERP system. It will be understood that method 300 elements and processes for authority checks may be repeated individually one-by-one for the other originating ERP systems and that results of method 300 for authority checks by individual ERP systems can be combined at suitable junctures in the method.

With renewed reference to FIG. 3, method 300 further includes sending an "authority checks" request from the ECMI layer to the originating ERP system for authority checks on the business object attachments stored in the content management system (340). The authority checks request to the originating ERP system may include object identifier and object type identifier values found in the fetched object information for the business object attachments. The authority checks request may also include the user credentials (e.g. user id) associated with or included in the client or application's query request. The ECMI layer may forward the request, for example, to a remote authentication interface (e.g., remote function call access 117) of the ERP system.

It will be understood that the authority checks request sent from the ECMI layer to the originating ERP system may be a single request for authorization checks on all of the business object attachments stored in the content management system. Alternatively, the authority checks request sent from the ECMI layer to the originating ERP system may be broken up into a series of sub-requests for one-by-one authorization checks on individual business object attachments or individual batches of the business object attachments. A maximum size of a batch of the business object attachments referenced in a sub-request for authorization checks may be related, for example, to a data handling capacity of the remote authentication interface (e.g., remote function call access 117) of the ERP system to receive and process data arrays (e.g., of object identifier and object type identifier values), which may be included in the sub-request, at one time.

In response to the authority checks request sent from the ECMI layer 340, method 300 may include conducting authority checks on the ERP system (350). The ERP system may, for example, conduct the authority checks for each business object attachment based on object attributes (e.g., object identifier and object type identifier values) included in the authority checks request sent from the ECMI layer. The remote authentication interface of the ERP system receiving the authority checks request from the ECMI layer may, for example, pass forward values for object identifiers, object type identifiers and user id to an authority check module in the ERP system. The authority check module may evaluate or compare the forwarded values for object identifier, object type identifier and user id for each business object attachment with business object authorities (e.g., ACL 112) stored in the ERP system(s) The authority check module may return results of the evaluation (i.e. grant or denial of authority) for each business object attachment to the remote authentication interface of the ERP system, which in turn may send the results of the authority checks to the ECMI layer (360). The remote authentication interface of the ERP system may, for example, send the results of authority checks (i.e. grant or denial of authority) via return call(s) from the ERP system to the API of the ECMI layer.

Method 300 may further include processing the results of the authority checks for the business object attachments received from the ERP system at the ECMI layer and notifying (370). In the case of a grant of authority for all business object attachments by the ERP system, processing the results of the authority checks received from the ERP system at the ECMI layer 370 may include sending a grant or approval notification to the client or application initiating the query request and sending notification of the approved query authorization request to the content management system (e.g., via a service provider interface 126). The content management system may in response process the client or application's query and report the query results to the client or application.

Conversely, in the case of denial of authority for one or more business object attachments by the ERP system, processing of the results at the ECMI layer 370 may include sending a denial or error notification to the client or application initiating the query request. Alternatively, in the case of partial grant of authority (i.e. grant of authority for some of the business object attachments and denial of authority for other of the business object attachments), processing of the results at the ECMI layer 370 may include reporting the partial grant of authority to the content management system. The content management system may in response process the client or application's query to cover only those business object attachments for which there are grants of authority and report filtered query results (i.e. excluding business object attachments for which there are denials of authority) to the client or application.

The various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method, comprising:
at a content management interface layer communicatively coupled to a store of business object attachments that are semantically associated with business objects of a plurality of remote computer systems, wherein for each business object attachment the store of business object attachments includes an object identifier, an object type identifier and an originating system identifier identifying the remote computer system hosting the business object associated with the business object attachment, the content management interface layer having an application programming interface (API) configured to expose the store of business object attachments to an application external to the plurality of remote computer systems hosting the business objects,
receiving via the API a request for authorization to access at least one business object attachment from the application external to the plurality of remote computer systems hosting the business objects;

processing the request for authorization to semantically identify an originating computer system of a parent business object of the at least one business object attachment;

sending a request for user authority checks on the parent business object of the at least one business object attachment to the originating computer system;

receiving results of user authority checks on the parent business object of the at least one business object attachment by the originating computer system; and processing the received results of the user authority checks on the parent business object of the at least one business object attachment by the originating computer system.

2. The method of claim 1, wherein receiving a request for authorization to access or manipulate at least one business object attachment from the external application includes receiving a request for authorization to manipulate a previously retrieved business object attachment from the external application.

3. The method of claim 2, wherein receiving the request for authorization to manipulate the previously retrieved business object attachment from the external application includes receiving values of an object identifier, an object type identifier, and an origin system identifier associated with the previously retrieved business object attachment with the request for authorization.

4. The method of claim 3, wherein processing the request for authorization to identify the originating computer system of the parent business object of the at least one business object attachment includes using the received value of the origin system identifier associated with the previously retrieved business object attachment to identify the originating computer system.

5. The method of claim 3, wherein sending a request for user authority checks on the parent business object of the previously retrieved business object attachment to the originating computer system includes sending the received values of the object identifier and the object type identifier associated with the previously retrieved business object attachment to the originating computer system.

6. The method of claim 3, wherein receiving results of user authority checks on the parent business object of the previously retrieved business object attachment by the originating computer system includes receiving the results of user authority checks via a remote access interface of the originating computer system.

7. The method of claim 3, wherein processing the received results of the user authority checks on the parent business object of the previously retrieved business object attachment by the originating computer system includes:

if the external application is authorized by the originating computer system to manipulate the previously retrieved business object attachment, notifying the external application that the request for authorization to manipulate the previously retrieved business object attachment is approved.

8. The method of claim 1, wherein receiving the request for authorization to access or manipulate at least one business object attachment from an external application user includes receiving a query request requiring access to the business object attachments stored in the store of business object attachments from the external application user.

9. The method of claim 8, wherein processing the request for authorization to identify the originating computer system of the parent business object of the at least one business object attachment includes:

fetching values the object identifier, object type identifier and origin system identifier associated with the at least one business object attachment; and using the fetched value of the origin system identifier to identify the originating computer system.

10. The method of claim 9, wherein sending the request for user authority checks on the parent business object of the at least one business object attachment to the originating computer system includes sending the fetched values of the object identifier and the object type identifier associated with the at least one business object attachment to the originating computer system.

11. The method of claim 8, wherein receiving results of user authority checks on the parent business object of the at least one business object attachment to the originating computer system includes receiving the results of user authority checks via a remote access interface of the originating computer system.

12. The method of claim 8, wherein processing the received results of the user authority checks on the parent business object of the at least one business object attachment by the originating computer system includes:

if the external application user is authorized by the originating computer system to access all of the business object attachments covered by the query request, notifying the store of business object attachments that the external application user's query request is approved.

13. The method of claim 8, wherein processing the received results of the user authority checks on the parent business object of the at least one business object attachment by the originating computer system includes:

if the external application user authorized by the originating computer system to access to less than all of the business object attachments covered by the query request, notifying the store of business object attachments that the external application user's query request is partially approved for access to less than all of the business object attachments.

14. A system, comprising:

a store of business object attachments that are semantically associated with business objects hosted on a plurality of remote computer systems, wherein for each business object attachment the store of business object attachments includes an object identifier, an object type identifier and an originating system identifier identifying the remote computer system hosting the business object associated with the business object attachment; and a content management interface layer communicatively coupled via a service provider interface to the store of business object attachments, the content management interface layer having an application programming interface (API) configured to expose the store of business object attachments to an application external to the plurality of remote computer systems hosting the business objects and to receive an authorization request from the application for access to a requested business object attachment, wherein the content management interface layer is configured to identify one of the plurality of remote computer systems as hosting the business object associated with the requested business object attachment and to call the identified remote computer system regarding authorities for access to the requested business object attachment by the application.

15. The system of claim 14, wherein the content management interface layer is further configured to:

use an originating system identifier value associated with the at least one business object attachment to identify an originating computer system of a parent business object of the at least one business object attachment; and send the object identifier and object identifier values associated with the at least one business object attachment with a request for user authority checks on the parent business object of the at least one business object attachment to a remote access interface of the originating computer system.

16. The system of claim 14, wherein the content management interface layer is further configured to receive and process results of user authority checks on the parent business object of the at least one business object attachment by the originating computer system; and notify the store of business object attachments if the authorization request for access to at least one business object attachment from the external application is approved.

17. A non-transitory computer readable medium, comprising:

instructions capable of being executed on a microprocessor to operate a content management interface layer that is communicatively coupled to a store of business object attachments that are semantically associated with business objects of a plurality of remote computer systems, wherein for each business object attachment the store of business object attachments includes an object identifier, an object type identifier and an originating system identifier identifying the remote computer system hosting the business object associated with the business object attachment, the content management interface layer communicatively coupled via a service provider interface to the store of business object attachments, the content management interface layer having an application programming interface (API) configured to expose the store of business object attachments to an application external to the plurality of remote computer systems hosting the business objects, which instructions when executed allow the content management interface layer to process a request from an external client or application for authorization to access or manipulate at least one business object attachment by identifying one of the plurality of remote computer systems as hosting the business object associated with the requested at least one business object attachment and to call the identified remote computer system regarding authorities for access to the requested business object attachment by the application.

18. The non-transitory computer readable medium of claim 17, wherein the instructions when executed on the microprocessor cause the content management interface layer to:

send object identifier and object identifier values associated with the at least one business object attachment with a request for user authority checks on the parent business object of the at least one business object attachment to a remote access interface of an originating computer system of the at least one business object attachment.

19. The non-transitory computer readable medium of claim 17, wherein the instructions when executed on the microprocessor cause the content management interface layer to:

process results of user authority checks on the parent business object of the at least one business object attachment by an originating remote computer system of the at least one business object attachment; and notify the store of business object attachments if the request for authorization to access or manipulate at least one business object attachment from the external client or application is approved.

* * * * *